United States Patent

Calligaris et al.

[15] 3,647,450

[45] Mar. 7, 1972

[54] ELECTROLESS DEPOSITION OF NI OR CO LIGHT-GENERATED AG NUCLEI

[72] Inventors: Ennio Calligaris; Mario Rossello, both of Savona, Italy

[73] Assignee: Societa per Azioni Ferrania, Milan, Italy

[22] Filed: Sept. 9, 1968

[21] Appl. No.: 758,608

[30] Foreign Application Priority Data

Sept. 14, 1967 Italy ................................39409 A/67

[52] U.S. Cl. ..........................................96/48, 96/49, 96/50, 96/66

[51] Int. Cl. ..........................................................G03c 5/24

[58] Field of Search ...........................96/48 PD, 49, 50, 66; 117/130 E, 130 B, 47 R, 213

[56] References Cited

UNITED STATES PATENTS

| | | | |
|---|---|---|---|
| 2,750,292 | 6/1956 | Dippel et al. | 96/48 |
| 3,431,120 | 3/1969 | Weisenberger | 117/130 X |
| 3,446,619 | 5/1969 | Gilman et al. | 96/63 |
| 3,512,972 | 5/1970 | Case | 96/48 PD |

FOREIGN PATENTS OR APPLICATIONS

| | | | |
|---|---|---|---|
| 1,064,725 | 4/1967 | Great Britain | 96/48 |

*Primary Examiner*—Norman G. Torchin
*Assistant Examiner*—Won H. Louie, Jr.
*Attorney*—Kinney, Alexander, Sell, Steldt & Delahunt

[57] ABSTRACT

An imaging process is shown wherein a recording element having a photosensitive layer comprising a composition which, upon light exposure, is capable of producing silver nuclei is exposed to a light image to cause formation of said nuclei. Upon said nuclei is then deposited a nonnoble metal by electroless deposition from a solution comprising a nonnoble metal and a reducing agent selected from the group consisting of an amine borane, a borohydride, and a combination of an amine borane and a borohydride. Also shown are recording elements produced by this method.

7 Claims, No Drawings

ELECTROLESS DEPOSITION OF NI OR CO LIGHT-GENERATED AG NUCLEI

This invention relates to an imaging process and to image-containing recording elements produced thereby.

Processes in which electroless deposition is utilized to enhance or develop an image on a recording element are known and have been reported in the literature. One approach utilizes the ability of light to reduce ferric salts to ferrous salts, which ferrous salts serve as reducing agents for the reduction of noble metal ions to free noble metal. Among the several processes of this type are the platinotype, palladiotype, iron-gold systems, iron-mercury systems, and iron-silver (i.e., "-brown print") systems, in which visible images are obtained by the reduction to free metal of platinum, palladium, gold, mercury, and silver ions.

Primarily because of the large quantities of expensive noble metals required, these processes have not found great practical application. Belgium Pat. No. 637,058 describes an imaging method wherein a latent image of silver or mercury, produced by exposure to a light image as described above, is "activated" by treating the latent image areas with a solution of a salt of the platinum group, such as palladium chloride, to provide catalytic nuclei for the electroless deposition thereon of a less-expensive nonnoble metal such as nickel or cobalt. Expensive quantities of metals of the platinum group, however, are required for this process.

An imaging process utilizing electroless deposition of nonnoble metals which does not require the use of metals of the platinum family (e.g., platinum, palladium, etc.) would be highly desirable and would greatly further the art.

It is therefore an object of the present invention to provide an imaging process utilizing electroless deposition which requires the use of very small amounts of silver as the sole noble metal.

Another object is to provide a simple imaging process which provides stable image reproductions of high resolution and contrast.

Briefly, the present invention relates to an imaging process comprising:

a. exposing to a light image a recording element having a photosensitive layer comprising a composition which, upon light exposure, is capable of producing silver nuclei; and b. plating nonnoble metal selectively on said silver nuclei by electroless deposition from a solution comprising a nonnoble metal compound and, as a reducing agent, an amine borane, a borohydride, or a mixture thereof.

This invention further relates to a recording element comprising a layer having light-exposed areas and non-light-exposed areas, the layer having light-generated silver nuclei selectively in the light-exposed areas and having an electroless deposit of a nonnoble metal selectively superimposed on the silver nuclei.

U.S. Pat. application Ser. No. 644,792 teaches a method for producing image-bearing recording elements by an electroless deposition technique using nuclei of metals more noble than silver (i.e., platinum, palladium, etc.) as catalytic deposition sites. Various electroless plating procedures are illustrated by U.S. Pat. Nos. 2,532,284; 2,690,401; 2,690,402; 2,726,969; 2,762,733; 2,871,142; and 3,011,920. The use of amine borane compounds as reducing agents in chemical plating techniques has been mentioned in U.S. Pat. No. 3,338,726. The electroless deposition of metals involves the simultaneous reduction of metal ions and oxidation of a reducing agent on catalytic surfaces, resulting in the deposition of free metal atoms on the catalytic surfaces.

Evidence indicates that light-generated silver nuclei are formed in light-struck areas of the recording element of the present invention upon exposure of the element to light image. Such silver nuclei may be formed autogeneously (i.e., wherein the silver compound is itself photosensitive), or may be formed by the reaction of silver compounds in the photosensitive layer with certain photosensitive compositions capable, upon light exposure, of reducing a silver compound to silver nuclei. Such photosensitive compositions may include organic salts of Iron III such as ferric ammonium oxalate, ferric potassium oxalate, ferric ammonium citrate, ferric ammonium tartrate, etc. It is contemplated that various other photosensitive compounds, such as those taught in U.S. Pat. No. 2,854,338 and British Pat. No. 1,088,856, may be used as well. Upon exposure to light of a recording element containing one of the above-mentioned ferric compounds, the ferric compound is apparently reduced to a ferrous salt which in turn reduces the silver compound present in the recording element to silver nuclei. Thereafter, a nonnoble metal is deposited on the silver nuclei from an electroless deposition solution comprising a nonnoble metal compound and a reducing agent selected from the group consisting of amine boranes, borohydrides, or combinations of amine boranes and borohydrides. Image-bearing recording elements produced by the process of the present invention exhibit greater general and spectral sensitivity then has heretofore been achieved with recording elements bearing reversed images developed by electroless deposition techniques.

The process of the present invention preferably is utilized in the production of halftone image reproductions. It is also possible, however, to produce continuous tone image reproductions by carefully regulating the intensity of exposing radiation in the process of the present invention.

"Silver nuclei" as used herein are reduced forms of silver compounds contained within photosensitive layers of the recording elements of the present invention, e.g., free silver metal nuclei.

In practice, a solution of a photosensitive composition comprising a photosensitive compound such as ferric ammonium citrate and a silver compound such as silver nitrate is thinly spread on a suitable support such as a saponified cellulose triacetate film. The photosensitive solution preferably also contains a hydrophilic polymer such as a polyether glycol (e.g., polyethylene glycol), polyvinyl alcohol, gelatin, etc., and a small amount of surfactant. After drying, the film is exposed through a transparent negative original (e.g., a line negative) to ultraviolet light. A perceptable image of silver nuclei is formed in light-exposed areas of the element. The recording element bearing the image of silver nuclei is then treated in an electroless deposition solution comprising a nonnoble metal compound (e.g., nickel sulfate) and a reducing agent of the present invention (e.g., dimethylamine borane). The nonnoble metal deposits selectively on the silver nuclei by electroless deposition. If, prior to electroless deposition the recording element bearing the image of silver nuclei is washed with a solution capable of dissolving away unreduced silver compounds, the image which results after electroless deposition exhibits greater sharpness and resolution.

Suitable supports for recording elements of the present invention include glass, wood, papers of various types, fabrics, and polymeric film such as saponified cellulose diacetate and triacetate, cellophane, and other substrates useful in the photographic industry.

Examples of nonnoble metal compounds which can be used in the electroless plating solution of the present invention include compounds of nickel, cobalt, copper, etc. Nickel and cobalt salts are especially preferred because of the dense, black images they afford.

The following examples are presented for illustrative purposes only and should not be construed as limiting the scope of the present invention.

EXAMPLE 1

To a solution of 0.1 g. of silver nitrate in 100 ml. of water were added 1.0 g. of ferric ammonium citrate and 1.0 ml. of a 2 percent aqueous solution of an anionic liquid detergent (sodium salt of the sulfate ester of an alkylphenoxy-poly (ethyleneoxy) ethanol, "Alipal CO 433," a trademarked product of General Aniline and Film Corporation). The resulting photosensitive solution was coated on a paper support and dried.

The photosensitive paper thus prepared was exposed through a negative original for 60 sec. to ultraviolet radiation and thereafter was immersed in a bath of 10 ml. of concentrated ammonium hydroxide in 100 ml. of water until the silver compound in non-light-exposed areas of the element had been dissolved and washed away. The imaged paper was then immersed in an electroless deposition solution which was maintained at 80° C. and which was composed of:

| | |
|---|---|
| water | 1,000 ml. |
| nickel sulfate | 4.0 g. |
| lactic acid | 4.0 g. |
| 32% ammonium hydroxide | to pH 6.5 ±0.5 |
| dimethylamine borane | 1.0 g. |

until a reversed, black image of the negative original was obtained having a maximum optical density of about 4.0

EXAMPLE 2

The procedure of Example 1 was repeated except that the following formulations were used for the photosensitive solution, the wash bath, and the electroless deposition solution:

| | | |
|---|---|---|
| a. | Photosensitive solution | |
| | water | 1,000 ml. |
| | silver nitrate | 0.2 g. |
| | ferric ammonium citrate | 2.0 g. |
| | 2% Alipal CO 433 (a trade marked product of Antara Chemicals) | 1.0 g. |
| b. | First bath | |
| | water | 90 ml. |
| | 32% ammonium hydroxide | 10 ml. |
| | citric acid | 5.0 g. |
| c. | Electroless deposition solution | |
| | water | 1,000 ml. |
| | nickel sulfate | 4.0 g. |
| | lactic acid | 4.0 g. |
| | sodium fluoride | 3.0 g. |
| | sodium succinate | 3.0 g. |
| | 32% ammonium hydroxide | to pH 6.5±0.5 |
| | dimethylamine borane | 1.0 g. |

The electroless plating solution was maintained at 80° C. The reversed image thereby obtained exhibited greater image density than did the image of Example 1, and the background of the image was a purer white.

EXAMPLE 3

The procedure of Example 1 was repeated using the following formulations for the photosensitive solution, the first bath, and the electroless deposition solution:

| | | |
|---|---|---|
| a. | Photosensitive solution | |
| | water | 100 g. |
| | silver nitrate | 0.15 g. |
| | ferric ammonium citrate | 1.5 g. |
| | 2% Alipal CO 433 (a trade marked product of Antara Chemicals) | 1.0 ml. |
| | PEG 6000 (a polyethylene glycol of 6000 average molecular weight; a product of Kessler Chemical Co.) | 3.0 g. |
| b. | First bath | |
| | water | 90 ml. |
| | 32% ammonium hydroxide | 10 ml. |
| | citric acid | 5.0 g. |
| | sodium potassium tartrate | 5.0 g. |
| c. | Electroless deposition solution | |
| | water | 1,000 ml. |
| | nickel sulfate | 4.0 g. |
| | lactic acid | 4.0 g. |
| | sodium fluoride | 3.0 g. |
| | sodium succinate | 3.0 g. |
| | 32% ammonium hydroxide | to pH 6.5±0.5 |
| | dimethylamine borane | 1.0 g. |

Results similar to those of Example 2 were obtained, but with slightly improved image quality.

EXAMPLE 4

The procedure of Example 3 was repeated except that an electroless deposition solution having the following composition was employed:

| | |
|---|---|
| water | 1,000 ml. |
| nickel sulfate | 4.0 g. |
| nickel chloride | 2.0 g. |
| ethylene diamine | 4.5 g. |
| lactic acid | 4.0 g. |
| sodium hydroxide | 4.0 g. |
| dimethylamine borane | 0.6 g. |
| sodium borohydride | 0.1 g. |

Results similar to those of Example 3 were obtained.

EXAMPLE 5

The procedure of Example 3 was repeated except that the solution for preparing the photosensitive layer was of the following composition:

| | |
|---|---|
| water | 100 ml. |
| silver acetate | 0.15 g. |
| ferric ammonium citrate | 1.5 g. |
| PEG 6000 (a product of Kessler Chemical CO.) | 3.0 g. |
| 2% Alipal CO 433 (a trade marked product of Antara Chemicals) | 1.0 ml. |

Results similar to those of Example 3 were obtained.

EXAMPLE 6

The procedure of Example 5 was repeated except that the silver acetate was replaced by 0.15 g. of silver lactate. Similar results were obtained.

EXAMPLE 7

| | |
|---|---|
| A photosensitive coating solution of | |
| water | 98 ml. |
| silver nitrate | 0.3 g. |
| ferric ammonium citrate | 3.0 g. |
| 2% Alipal CO 433 (a trade marked product of Antara Chemicals) | 2.0 ml. |

was coated on a saponified cellulose triacetate film and was dried. The recording element thus produced was exposed and processed as in Example 3, and similar results were obtained.

EXAMPLE 8

| | |
|---|---|
| A solution of | |
| gelatin | 4.0 g. |
| water | 100 ml. |
| 2% Alipal CO 433 (a trade marked product of Antara Chemicals) | 1.0 ml. |
| 4% aqueous formaldehyde solution | 5.0 ml. |

was coated on a cellulose triacetate film and was maintained for 2 days at 50° C. The sheet was thereafter immersed for 30 seconds in a solution of

| | |
|---|---|
| water | 100 ml. |
| silver nitrate | 0.3 g. |
| ferric ammonium citrate | 3.0 g. |
| 2% Alipal CO 433 (a trade marked product of Antara Chemicals) | 1.0 ml. |

After drying, the film was exposed and developed according to Example 3. Similar results were obtained.

EXAMPLE 9

| | |
|---|---|
| A solution of | |
| water | 100 ml. |
| ferric ammonium oxalate | 1.5 g. |
| 2% Alipal CO 433 (a trade marked product of Antara Chemicals) | 1.0 ml. |

was coated onto a paper sheet. After drying, a solution of

| | |
|---|---|
| water | 100 ml. |
| silver nitrate | 0.15 g. |
| 2% Alipal CO 433 (a trade marked product of Antara Chemicals) | 1.0 ml. |

was spread over the previously coated solution and was dried. Exposure and development was carried out as in Example 3 and similar results were obtained.

EXAMPLE 10

| | |
|---|---|
| A solution of | |
| water | 98 ml. |
| silver nitrate | 0.34 g. |
| ferric ammonium citrate | 3.4 g. |
| PEG 6000 (a product of Kessler Chemical Co.) | 3.4 g. |
| 2% Alipal CO 433 (a trade marked product of Antara Chemicals) | 2.0 ml. |

was coated onto a paper sheet and dried at 50° C. After exposure through a negative original, the sheet was immersed for 60 seconds in a solution of

| | |
|---|---|
| water | 900 ml. |
| 32% ammonium hydroxide | 100 ml. |
| sodium potassium tartrate | 50 g. |
| citric acid | 50 g. |

During immersion the image intensified noticeably. After washing with water, the sheet was immersed for 90 seconds in an electroless deposition solution at 75°–80° C. which was composed of

| | |
|---|---|
| water | 1,000 ml. |
| cobalt chloride | 40 g. |
| lactic acid | 40 g. |
| 32% ammonium hydroxide | to pH 6.0±0.5 |
| dimethylamine borane | 20 g. |

A black image of good quality and excellent stability was obtained.

EXAMPLE 11

The procedure of Example 10 was repeated except that the electroless plating solution was composed of

| | |
|---|---|
| water | 1,000 ml. |
| iron sulfate | 20 g. |
| nickel sulfate | 20 g. |
| lactic acid | 40 g. |
| 32% ammonium hydroxide | to pH 6.0±0.5 |
| dimethylamine borane | 6.0 g. |

Upon immersion of the paper sheet for 45–60 seconds in this solution, gray-black images of good quality were obtained. This method may be advantageously used to provide continuous tone image reproductions.

EXAMPLE 12

The procedure of Example 10 was repeated except that the electroless deposition solution was composed of

| | |
|---|---|
| water | 1,000 ml. |
| sodium tungstate | 20 g. |
| nickel sulfate | 20 g. |
| lactic acid | 40 g. |
| ammonium hydroxide | to pH 6.0±0.5 |
| dimethylamine borane | 6.0 g. |

Results similar to those of Example 10 were obtained.

EXAMPLE 13

The procedure of Example 10 was repeated except that the electroless deposition solution was composed of

| | |
|---|---|
| water | 1,000 ml. |
| chromium fluoride | 15 g. |
| chromium chloride | 1.0 g. |
| nickel sulfate | 20 g. |
| lactic acid | 40 g. |
| ammonium hydroxide | to pH 6.0±0.5 |
| dimethylamine borane | 6.0 g. |

The electroless deposition solution was maintained at 75°–80° C. and the period of immersion was 30 seconds. Results similar to those of Example 10 were obtained.

Various other embodiments of the present invention will be apparent to those skilled in the art without departing the scope thereof.

What is claimed is:

1. A recording element comprising a layer having light-exposed areas and non-light-exposed areas, said layer having light-generated silver nuclei selectively in light-exposed areas and having an electroless deposit of nickel or cobalt selectively superimposed on said light-generated silver nuclei.

2. An imaging process which comprises
   a. exposing to a light image a recording element having a photosensitive layer comprising a composition which, upon light exposure, is capable of producing silver nuclei; and
   b. plating nickel or cobalt metal selectively on said silver nuclei by electroless deposition from a solution comprising nickel or cobalt metal compound and, as a reducing agent, an amine borane, a borohydride, or a mixture thereof.

3. The imaging process of claim 2 additionally comprising washing said exposed recording element with a solution capable of dissolving said silver compound therefrom, thereby removing said silver compound from non-light-exposed areas of said element prior to said electroless deposition.

4. The process of claim 2 wherein said reducing agent is dimethylamine borane.

5. The process of claim 2 wherein said reducing agent is a mixture of dimethylamine borane and sodium borohydride.

6. An imaging process comprising
   a. exposing to a light image a recording element having a photosensitive layer comprising a compound of silver and an Iron III compound capable, upon light exposure, of reducing said compound of silver to silver nuclei; and
   b. depositing nickel or cobalt metal selectively on said silver nuclei by electroless deposition from a solution comprising a nickel or cobalt metal compound and dimethylamine borane.

7. A recording element comprising a layer having light-exposed areas and non-light-exposed areas, said layer having light-generated silver nuclei selectively in light-exposed areas and having a nickel or cobalt metal selectively superimposed on said silver nuclei by electroless deposition from a solution comprising said nickel or cobalt metal compound and an amine borane, a borohydride, or a mixture of an amine borane and a borohydride.

* * * * *